United States Patent [19]

Pravaz

[11] 4,191,349
[45] Mar. 4, 1980

[54] PARACHUTE HAVING AN IMPROVED MULTI-CELL CANOPY

[75] Inventor: Marcel H. Pravaz, Clichy, France

[73] Assignee: Cabinet Lavoix, Paris, France

[21] Appl. No.: 926,523

[22] Filed: Jul. 19, 1978

[30] Foreign Application Priority Data

Mar. 24, 1978 [FR] France ............................... 78 08664

[51] Int. Cl.² .......................................... B64D 17/14
[52] U.S. Cl. .................................... 244/145; 244/152; 244/DIG. 1
[58] Field of Search ........... 244/145, 142, 152, DIG. 1

[56] References Cited

U.S. PATENT DOCUMENTS

| 3,393,885 | 7/1968 | Neumark ............................... 244/145 |
| 4,015,801 | 4/1977 | Womble et al. ...................... 244/145 |

*Primary Examiner*—Barry L. Kelmachter
*Attorney, Agent, or Firm*—Irons and Sears

[57] ABSTRACT

The multi-cell canopy of the gliding wing type comprises an upper wall and a lower wall interconnected by ribs forming partition wall defining parallel cells open on the leading edge of the wing. Parachute control lines are secured to the trailing edge for deforming a part of the latter which forms a plain flap. The canopy comprises in its upper wall at least one air outlet passage which has the shape of a rearwardly facing slot so as to direct a laminar current of air tangentially of the upper wall.

6 Claims, 3 Drawing Figures

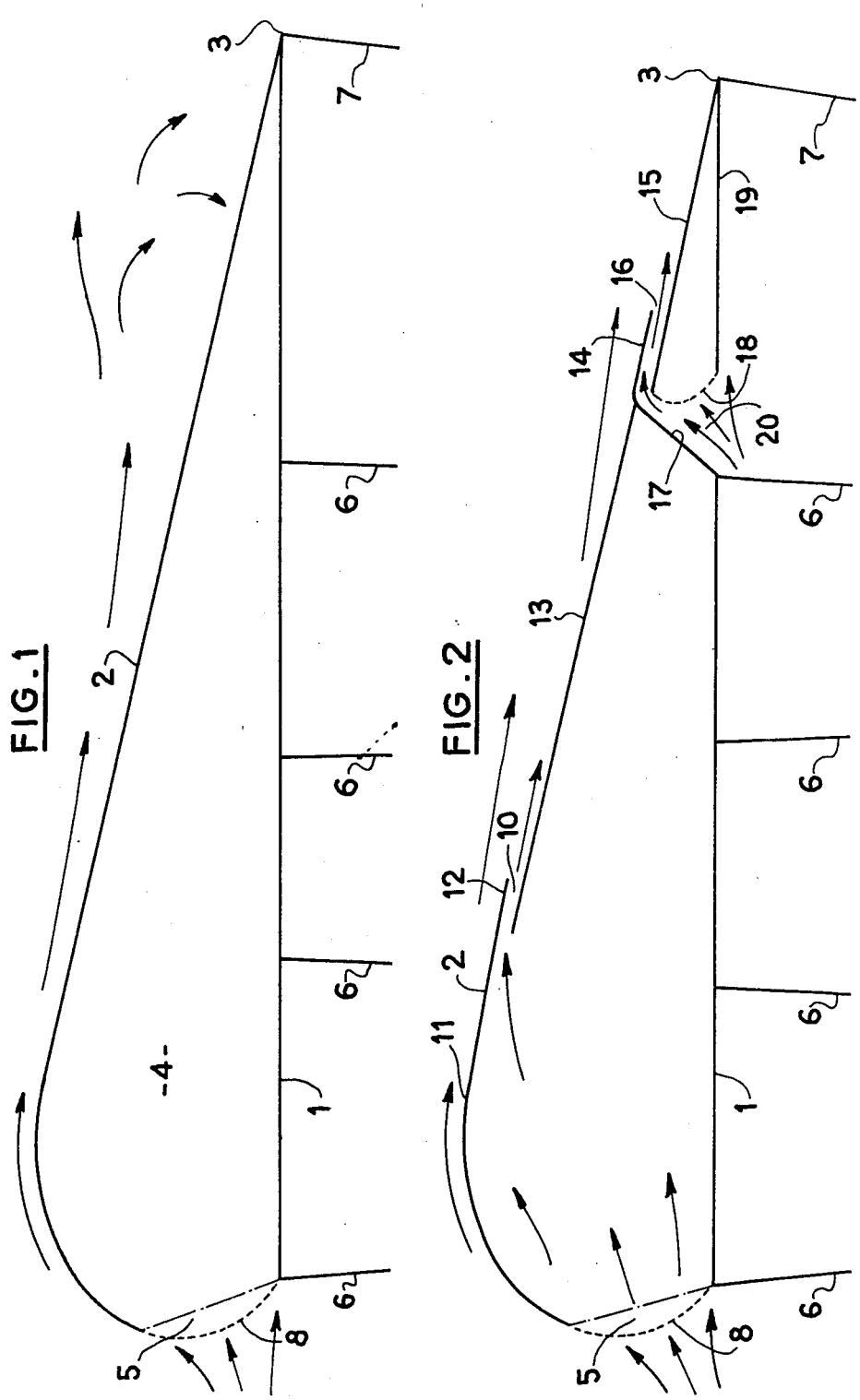

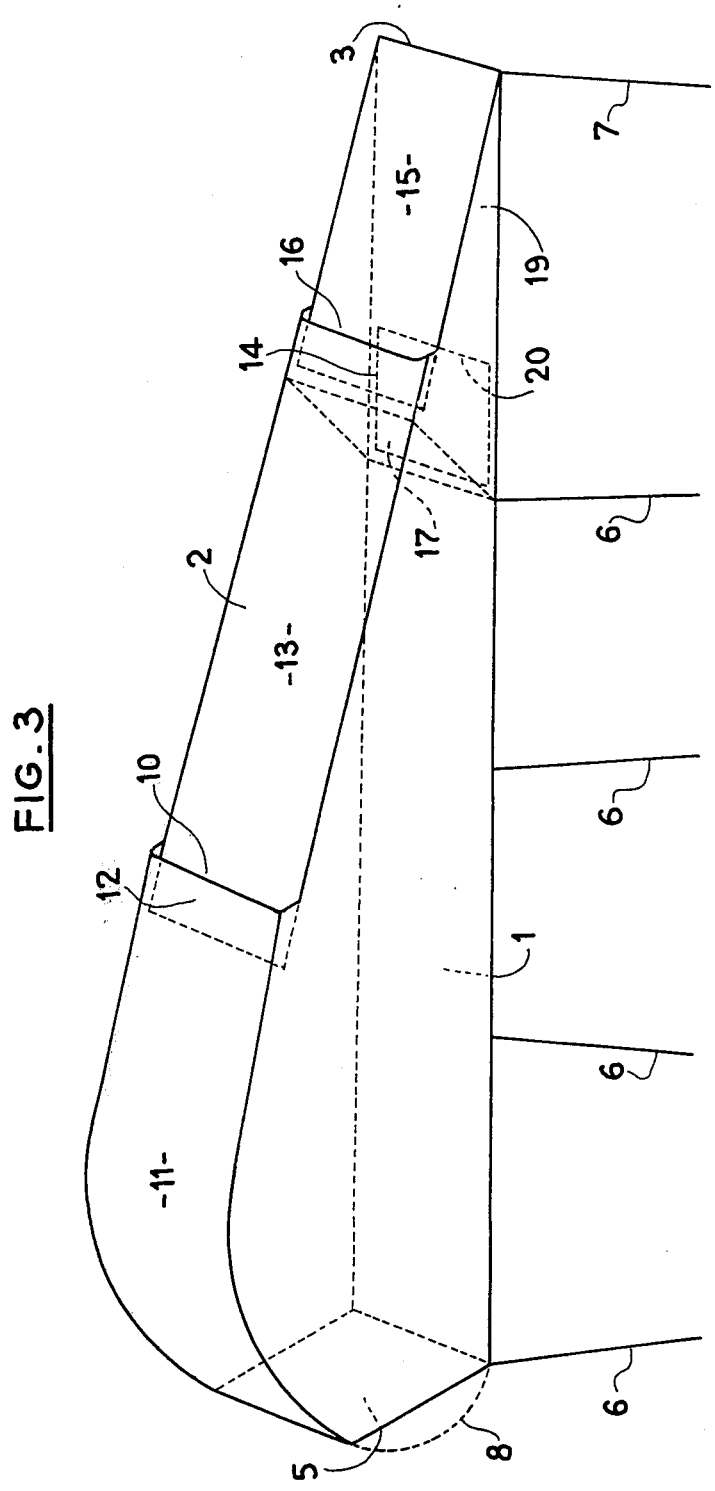

PARACHUTE HAVING AN IMPROVED MULTI-CELL CANOPY

The present invention relates to parachutes of the type having a multi-cell canopy forming a flexible gliding wing.

The basic principle of parachutes having a multi-cell structure is well known and in wide use. The canopies of these parachutes are formed by adjacent cells which are defined by lower walls, upper walls and lateral walls or ribs and have an aircraft airfoil wing shape of a certain thickness. The cells are open on their leading edge and, in the course of the opening of the parachute and the descent, the air enters and inflates the cells and imparts stiffness to the canopy. In the course of the descent, the air accumulated in the cells forms a zone of stagnant air pressure in the region of the leading edge and re-constitutes as it were the profile of the leading edge and the unit behaves in the manner of a complete flexible wing, the air being deflected toward the lower surface and upper surface.

In these parachutes, the suspension lines are secured to the lower wall, usually in four groups in the region of the ribs defining the cells.

In descending, these parachutes have an airspeed of gliding flight and may be controlled by controls which are formed by control lines secured to the trailing edge of the canopy and allow the parachutist to deform a part of this trailing edge downwardly by exerting a pull on the corresponding line or lines, thereby creating a drag which, when exerted at one end of the wing, tends to turn the latter, or when the lines at the two ends are pulled at the same time, tends to decrease the gliding speed of the wing and thus has a braking effect.

Consequently, it will be understood that the rear part of the cells between the last group of suspension lines and the control lines may be likened to the plain flaps of a rigid wing.

The gliding multi-cell canopies of this type have lift properties which are a function of the airflow around the airfoil, which is determinant. In most airfoils, at a normal incidence of the latter, the airflow, which is laminar in the region of the leading edge of the lower surface and a part of the upper surface, tends to present certain turbulences on the latter in the vicinity of the trailing edge when the incidence is slightly increased, thereby decreasing the lift of the wing.

An object of the invention is to increase this lift by producing a hyperlift effect by an improvement in the flow of the end layer on the upper surface, in particular in the region of the rear part of the canopy which is employed in the manner of a plain flap of an aircraft wing.

According to the invention, there is provided a multi-cell parachute of the flexible gliding wing type, comprising in its upper wall at least one rearwardly facing air outlet passage whose orifice has the shape of a slot parallel to the trailing edge so as to direct a laminar current of air tangentially of the upper wall.

It will be understood that this laminar flow tangent to the upper wall tends to re-apply the airflow against the airfoil producing a laminar end layer and thereby producing a hyperlift effect.

Further features and advantages of the invention will be apparent from the ensuing description with reference to the accompanying drawings which are given solely by way of example and in which:

FIG. 1 is a diagrammatic sectional view of a multi-cell parachute canopy of the conventional gliding flexible wing type;

FIG. 2 is a diagrammatic view of the application of the device according to the invention to the canopy shown in FIG. 1, and FIG. 3 is a diagrammatic view of an embodiment of a canopy cell to which the invention has been applied.

With reference to FIG. 1, there is shown diagrammatically in section a cell of a parachute canopy of the gliding wing type. It comprises a lower wall 1, an upper wall 2 which are interconnected on their rear edge to constitute the trailing edge 3 of the canopy and are interconnected by roughly vertical lateral ribs or partition walls 4 only one of which is seen in FIG. 1. The cell defined in this way is open on its leading edge as shown at 5. The canopy is connected to the harness of the parachutist by suspension lines 6, and a control line 7 for controlling the parachute is secured to the trailing edge 3.

In the course of the descent, the air flows by way of the opening 5 of the leading edge into each cell in which it creates a pressure which inflates the cells and imparts stiffness to the canopy. Moreover, the air which accumulates in each cell then prevents any further penetration of air by creating a zone of stagnant air pressure which roughly re-constitutes the leading edge of the normal airfoil of the wing as shown in dotted lines at 8 and thus deflects the airflow toward the upper surface and toward the lower surface, as shown by the arrows.

It is well known that the airflow, which is first laminar on the upper wall, has a tendency to result in turbulence in the vicinity of the trailing edge, as shown by the arrows in FIG. 1. This tendency is more marked when the trailing edge of the canopy is made to deform in order to steer the gliding flight by creating a drag at one of the ends of the trailing edge or by creating the drag simultaneously at both ends of the trailing edge by a similar deformation of both ends of the latter so as to brake the flight.

According to the invention, in order to render the airflow more regular and re-apply it against the upper wall of a cell, there is provided in the latter a rearwardly facing air outlet passage 10 which has the shape of a slot the opening of which extends roughly parallel to the trailing edge along the width of the cell.

The passage 10 is provided at about between ⅓ and ¼ of the depth of the wing and is defined by the overlapping of two parts of the upper wall, that is to say a part 11 extending from the leading edge overlaps in a short length 12 thereof another part 13 of the upper wall which extends toward the trailing edge 3.

Likewise, the part 13 of the upper wall overlaps in a certain length 14 thereof a part 15 of the upper wall which extends to the trailing edge 3, these two parts 13 and 15 defining therebetween a rearwardly facing passage 16 forming a slot which is roughly parallel to the trailing edge.

However, while the passage 10 puts the interior of the cell in communication with the atmosphere through the upper wall so that the air which is trapped in the cell in flight can escape rearwardly through this passage 10, the passage 16 is supplied with air from the exterior through the lower wall so as to in particular avoid problems of deformation of the canopy in the zone of the control flaps.

For this purpose, the cell is closed by a wall 17 immediately upstream of the passage 16 whereas the rear part of the cell, corresponding to the part forming the control flap, remains open as shown at 18 in FIG. 2, the lower wall 19, forming a flap, being separated from the rest of the lower wall 1 by an opening 20 through which air can penetrate and inflate the separate rear end part of the cell by forming a zone of stagnant pressure which re-constitutes a leading edge 18 identical to the leading edge 8, the excess air escaping rearwardly of the upper wall of the flap.

A laminar end layer is produced in this way which increases the lift of the wing and the efficiency of the parts of the trailing edge which are employed as plain flaps by a blowing effect which produces a hyperlift effect.

It will be understood that the openings 16 and 20 of the upper wall and lower wall must be so disposed that the orientation of the leading edge of the flap is the reproduction of that of the leading edge of the wing and that the angle made by the wall which closes the rear end of the cell immediately upstream of the blowing opening of the flaps must be so calculated as to orient the airflow in the optimum path to achieve maximum aerodynamic efficiency of the considered wing, it being necessary that the air outlet passage defined by the superimposed parts of the upper wall constrain the air to issue tangentially of the upper wall, in particular on the flap, so as to exert its hyperlift effect on the flap.

The air outlet passage 12 located in the front part of the depth of the wing may be provided at different points of the span, and even, if desired, throughout the length of the wing, whereas the air outlet passages such as 16 provided to produce a hyperlift effect by a blowing of the parts forming flaps are as a rule only provided in the three or four end cells.

Having now described my invention what I claim as new and desire to secure by Letters Patent is:

1. A parachute having a multi-cell canopy of the gliding wing type having a leading edge and trailing edge, comprising an upper wall and a lower wall, a part of the upper wall and a part of the lower wall defining therebetween an opening adjacent the leading edge for entry of air which inflates the canopy, a part of the upper wall and a part of the lower wall also defining therebetween a plain flap adjoining the trailing edge, an air outlet passage in the shape of a slot in the upper wall, the slot being located in a region of said part of the upper wall defining the flap a little in front of the trailing edge relative to the direction of gliding, an opening in the lower wall and communicating with said outlet passage, a closing wall extending from the lower wall to the upper wall for closing a part of the canopy located in front of said opening in the lower wall relative to the direction of gliding, the part of the canopy forming said flap being open in a front part and communicating with said opening of the lower wall.

2. A parachute having a multi-cell canopy of the gliding wing type having a leading edge and trailing edge, comprising an upper wall and a lower wall, ribs forming partition walls interconnecting the upper wall and the lower wall and defining substantially parallel cells which are open on the leading edge, a plain flap adjoining the trailing edge and defined by a part of the upper wall and a part of the lower wall, parachute control lines secured to the trailing edge to permit a deformation of the plain flap, at least one rearwardly facing air outlet passage provided in the upper wall and communicating directly with the interior of one of said cells and having an outlet orifice in the shape of a slot which is substantially parallel to the trailing edge so as to direct a laminar air current tangentially of the upper wall, said at least one slot-shaped orifice being defined by structure comprising a first part of the upper wall extending from the leading edge in the direction of the trailing edge to a first edge for said passage, a second part of the upper wall which extends toward the trailing edge from a second edge located a little in front of said first edge relative to the direction of gliding, a portion of said first part of the upper wall adjoining said first edge being in overlying relation to a portion of said second part of the upper wall adjoining said second edge, a second air outlet passage in the shape of a slot in the upper wall, the slot of the second air outlet passage being located in a region of said part of the upper wall defining the flap a little in front of the trailing edge relative to the direction of gliding, an opening in the lower wall and communicating with said second outlet passage, a closing wall extending from the lower wall to the upper wall for closing a part of the cell located in front of said opening in the lower wall relative to the direction of gliding, a remaining rear part of the cell forming said flap being open in the front part of said rear part of the cell and communicating with said opening of the lower wall.

3. A parachute as claimed in claim 2, wherein said at least one slot-shaped orifice is located between ¼ and ⅓ of the depth of the canopy, the air supplying said at least one outlet passage coming from the interior of each cell of the canopy across which cell said slot extends.

4. A parachute as claimed in claim 2, wherein said opening of the lower wall and the second air outlet passage slot are so adapted and arranged that the cell part forming the flap has a leading edge having an orientation which is substantially the same as the orientation of the leading edge of the canopy, said closing wall extending from the lower wall to the upper wall being at an angle suitable for orienting the airflow tangentially of the flap-defining part of the upper wall in an optimum path for obtaining maximum aerodynamic efficiency of the canopy.

5. A parachute as claimed in claim 2 or 4, wherein each slot has a length which does not exceed the width of a cell.

6. A parachute as claimed in claim 4, wherein said second air outlet passages are provided only in the cells located at the trailing edge of the canopy.

* * * * *

UNITED STATES PATENT OFFICE
CERTIFICATE OF CORRECTION

Patent No. 4,191,349  Dated  March 4, 1980

Inventor(s)  Marcel H. Pravaz

It is certified that error appears in the above-identified patent and that said Letters Patent are hereby corrected as shown below:

On the front page of the patent containing the Abstract, the line for "Assignee" should be corrected to read as follows:

--Assignee:  Etudes et Fabrications Aeronautiques, Clichy, France--

In claim 1, line 13 (Col. 3, line 49 of the patent), delete "and".

In claim 2, line 31, (Col. 4, line 28 of the patent), delete "and".

In claim 6, line 1 (Col. 4, line 55 of the patent), delete "said".

In claim 6, line 2 (Col. 4, line 56 of the patent), delete "the".

In claim 6, line 3 (Col. 4, line 57 of the patent), delete "the trailing edge" and insert --ends-- in place thereof.

Signed and Sealed this

Twentieth Day of May 1980

[SEAL]

Attest:

SIDNEY A. DIAMOND

Attesting Officer    Commissioner of Patents and Trademarks